(12) United States Patent
Nakamoto et al.

(10) Patent No.: US 8,536,248 B2
(45) Date of Patent: Sep. 17, 2013

(54) REINFORCED THERMOPLASTIC RESIN COMPOSITION AND MOLDED ARTICLE

(75) Inventors: Masahito Nakamoto, Ube (JP); Koichi Tezuka, Ube (JP)

(73) Assignee: UMG ABS, Ltd. (JP)

( * ) Notice: Subject to any disclaimer, the term of this patent is extended or adjusted under 35 U.S.C. 154(b) by 0 days.

(21) Appl. No.: 13/497,758

(22) PCT Filed: Sep. 24, 2010

(86) PCT No.: PCT/JP2010/066520
§ 371 (c)(1),
(2), (4) Date: Mar. 22, 2012

(87) PCT Pub. No.: WO2011/037172
PCT Pub. Date: Mar. 31, 2011

(65) Prior Publication Data
US 2012/0178860 A1   Jul. 12, 2012

(30) Foreign Application Priority Data

Sep. 24, 2009   (JP) ................................ P2009-218504

(51) Int. Cl.
*C08K 9/04*   (2006.01)
(52) U.S. Cl.
USPC ........... 523/215; 523/205; 523/206; 523/209; 523/216; 523/217; 524/127
(58) Field of Classification Search
USPC .......... 523/205, 206, 209, 215–217; 524/127
See application file for complete search history.

(56) References Cited

FOREIGN PATENT DOCUMENTS

| CN | 1513028 A | 7/2004 |
|---|---|---|
| CN | 1938376 A | 3/2007 |
| CN | 101098925 A | 1/2008 |
| CN | 101099254 A | 1/2008 |
| CN | 101495406 A | 7/2009 |
| JP | 60088062 A | 5/1985 |
| JP | 2001240738 A | 9/2001 |
| JP | 2002069287 A | 3/2002 |
| JP | 2003268225 A | 9/2003 |
| JP | 2009155576 A | 7/2009 |

OTHER PUBLICATIONS

International Search Report; Application No. PCT/JP2010/066520; Issued: Nov. 18, 2010; Mailing Date: Nov. 30, 2010; 2 pages.
Notice of First Office Action from State Intellectual Property Office of the People's Republic of China Application No. 201080042166.X Notification Date: Feb. 18, 2013 11 pages.
Office Action Issued by State Intellectual Property Office of The People's Republic of China Application No. 201080042166.X Date of Notification: July 15, 2013 13 pages.

*Primary Examiner* — Peter Szekely
(74) *Attorney, Agent, or Firm* — St. Onge Steward Johnston & Reens LLC

(57) ABSTRACT

The reinforced thermoplastic resin composition of the present invention includes: 50 to 90% by weight of a polycarbonate resin (A); 10 to 50% by weight of a graft copolymer mixture (B) (provided that a total amount of the component (A) and the component (B) accounts for 100% by weight) which is obtained by graft-polymerizing an aromatic alkenyl compound monomer unit (a) and a vinyl cyanide compound monomer unit (b) onto a rubber polymer (B1); and 6 to 22 parts by weight of an inorganic filler (D) which has been surface-treated with a water-soluble polyamide, relative to the total of 100 parts by weight of the polycarbonate resin (A) and the graft copolymer mixture (B). There is provided a reinforced thermoplastic resin composition exhibiting excellent moldability, generates a minimal amount of gas during molding, and also being capable of improving the rigidity of the resulting molded article and the impact resistance when dropping the product.

5 Claims, No Drawings

REINFORCED THERMOPLASTIC RESIN COMPOSITION AND MOLDED ARTICLE

TECHNICAL FIELD

The present invention relates to a reinforced thermoplastic resin composition and a molded article that are used as materials for housings of laptop personal computers, liquid crystal projectors and portable devices, or the like.

Priority is claimed on Japanese Patent Application No. 2009-218504, filed Sep. 24, 2009, the content of which is incorporated herein by reference.

BACKGROUND ART

Acrylonitrile butadiene styrene (ABS) resins, thermoplastic resin compositions such as polycarbonate resins/ABS resins, or reinforced thermoplastic resin compositions prepared by reinforcing these thermoplastic resin compositions with inorganic fillers have been widely used as the housing materials of electronic devices such as laptop personal computers, liquid crystal projectors and portable devices. In general, as a method for producing a housing, an injection molding method in which the above resin compositions can be shaped freely to some extent has been employed.

In recent years, demands have increased for electronic devices to be thinner and more lightweight, and also to satisfactorily withstand the impacts and loads while being placed inside a bag or such containers. In order to satisfy these demands, the resin used for a housing has to have not only high rigidity and impact resistance, but also high drop impact resistance when the products are dropped.

Here, it has been known that the drop impact resistance when the products are dropped is highly correlated with the surface impact strength measured by a falling ball test in accordance with the UL1950 standard or the like, while showing a relatively low correlation with the Izod impact strength or the Charpy impact strength. Therefore, the resin used for a housing is required to have high surface impact strength rather than high Izod impact strength or Charpy impact strength.

Among the conventionally used resin materials for housings of electronic devices, the ABS resins or polycarbonate resins/ABS resins that are not reinforced by inorganic fillers have low rigidity and could not meet the demands for thinning of electronic device housings in recent years.

In addition, although glass fiber-reinforced resin compositions may be used in some cases as resin materials for housings of electronic devices, the balance between the rigidity and the weight has not been satisfactory.

For this reason, carbon fiber-reinforced thermoplastic resin compositions are now being examined as housing materials for electronic devices.

However, although conventional carbon fiber-reinforced thermoplastic resin compositions exhibit high rigidity and the weights thereof can be reduced, they are problematic as a housing material since they are brittle and easily broken.

Thus, as a means to overcome these problems, a resin composition has been proposed in Patent Document 1, which contains an aromatic polycarbonate resin, a carbon fiber which has been surface-treated with a polyamide, and a lubricant having at least one functional group selected from a carboxyl group, a carboxylic acid anhydride group, an epoxy group and an oxazoline group.

In Patent Document 1, although the carbon fiber which is subjected to a surface treatment with a polyamide dissolved in methyl alcohol has been used, there is a description stating that a high impact resistance (Izod impact strength) cannot be achieved solely by the use thereof. In addition, the carbon fiber disclosed in Patent Document 1 does not improve the surface impact strength. Moreover, because the resin composition described in Patent Document 1 contains a lubricant, a large amount of gas was generated during molding, which is undesirable.

In addition, as a means different from that of Patent Document 1, a carbon fiber-reinforced polycarbonate resin composition has been proposed in Patent Document 2, which contains a polycarbonate resin, a rubber-containing polymer and a carbon fiber sized by a polyamide-based sizing agent. As the rubber-containing polymer disclosed in Patent Document 2, MBS resins containing (meth)acrylates having an alkyl group of 1 to 18 carbon atoms, butadiene and styrene as main materials or MAS resins composed of methacrylates, acrylates and styrene have been used. As a polyamide-based sizing agent, nylon 3, nylon 4, nylon 6, nylon 66 or the like has been used.

However, it was impossible for the carbon fiber-reinforced polycarbonate resin composition described in Patent Document 2 to improve the surface impact strength.

CITATION LIST

[Patent Documents]

[Patent Document 1] Japanese Unexamined Patent Application, First Publication No. 2001-240738

[Patent Document 2] Japanese Unexamined Patent Application, First Publication No. Sho 60-88062

SUMMARY OF INVENTION

Technical Problem

It is an object of the present invention to provide a reinforced thermoplastic resin composition having excellent moldability, being capable of reducing the amount of gas generated during molding, and also being capable of improving the rigidity of the resulting molded article and the drop impact resistance (surface impact strength determined by a falling ball test) when dropping the product.

In addition, the present invention has an object of providing a molded article having high rigidity and impact resistance when dropping the product.

Solution to Problem

The present invention includes the following aspects.

[1] A reinforced thermoplastic resin composition characterized by containing 50 to 90% by weight of a polycarbonate resin (A); 10 to 50% by weight of a graft copolymer mixture (B) (provided that a total amount of the component (A) and the component (B) accounts for 100% by weight); and 6 to 22 parts by weight of an inorganic filler (D) which has been surface-treated with a water-soluble polyamide, relative to the total of 100 parts by weight of the polycarbonate resin (A) and the graft copolymer mixture (B), wherein the aforementioned graft copolymer mixture (B) contains a graft copolymer (B') in which a graft polymer (B2) having an aromatic alkenyl compound monomer unit (a) and a vinyl cyanide compound monomer unit (b) is graft-polymerized onto a rubber polymer (B1).

[2] The reinforced thermoplastic resin composition according to the above aspect [1] characterized by further containing a phosphoric acid ester-based flame retardant (E).

[3] The reinforced thermoplastic resin composition according to the above aspect [2] characterized in that the aforementioned phosphoric acid ester-based flame retardant (E) has a weight average molecular weight of at least 326 and not more than 800.

[4] The reinforced thermoplastic resin composition according to any one of the above aspects [1] to [3] characterized in that the aforementioned inorganic filler (D) which has been surface-treated with a water-soluble polyamide is a carbon fiber which has been surface-treated with a water-soluble polyamide.

[5] A molded article characterized by being formed through molding and processing of the reinforced thermoplastic resin composition according to any one of the above aspects [1] to [4].

Advantageous Effects of Invention

The reinforced thermoplastic resin composition of the present invention exhibits excellent moldability, generates a minimal amount of gas during molding, and also being capable of improving the rigidity of the resulting molded article and the drop impact resistance (surface impact strength determined by a falling ball test) when dropping the product.

The molded article of the present invention also has high rigidity and impact resistance when dropping the product.

DESCRIPTION OF EMBODIMENTS

[Reinforced Thermoplastic Resin Composition]

The reinforced thermoplastic resin composition of the present invention contains a polycarbonate resin (A), a graft copolymer mixture (B) and an inorganic filler (D) which has been surface-treated with a water-soluble polyamide as essential components.

Note that in the present description, a component including the polycarbonate resin (A) and the graft copolymer mixture (B) will be referred to as a main resin component (C).

<Polycarbonate Resin (A)>

The polycarbonate resin (A) is a resin obtained from a dihydroxydiarylalkane and may be optionally branched.

The polycarbonate resin (A) is produced by a known method. For example, this can be produced through a method of reacting a dihydroxy or polyhydroxy compound with phosgene or a carbonate diester, or through a melt polymerization method. In addition, even those recycled from compact discs or the like can also be used.

As the dihydroxydiarylalkane, for example, those having an alkyl group at the ortho position relative to the hydroxy group may be used. Specific examples of preferred dihydroxydiarylalkanes include 4,4-dihydroxy 2,2-diphenylpropane (that is, bisphenol A), tetramethyl bisphenol A and bis-(4-hydroxyphenyl)-p-diisopropylbenzene.

In addition, the branched polycarbonate can be produced by substituting a portion, for example, 0.2 to 2 mol %, of the dihydroxy compounds constituting the polycarbonate resin with a polyhydroxy compound. Specific examples of the polyhydroxy compound include phloroglucinol, 4,6-dimethyl-2,4,6-tri-(4-hydroxyphenyl)-heptene, 4,6-dimethyl-2,4,6-tri-(4-hydroxyphenyl)-heptane and 1,3,5-tri-(4-hydroxyphenyl)-benzene.

One type of these polycarbonate resins (A) may be used alone, or two or more types thereof may be mixed for use.

The viscosity average molecular weight (Mv) of the polycarbonate resin (A) is preferably from 15,000 to 35,000. If the viscosity average molecular weight of the polycarbonate resin (A) is 15,000 or higher, the impact resistance of the reinforced thermoplastic resin composition will be improved. If the viscosity average molecular weight of the polycarbonate resin (A) is 35,000 or lower, the moldability of the reinforced thermoplastic resin composition will be improved.

In addition, the viscosity average molecular weight (Mv) of the polycarbonate resin (A) is more preferably from 17,000 to 25,000, as such a range offers a particularly superior balance of the mechanical strengths, the surface impact strength determined by a falling ball test, and the fluidity.

[Content of Polycarbonate Resin (A)]

The content of the polycarbonate resin (A) in the main resin component (C) is from 50 to 90% by weight, and preferably from 80 to 90% by weight (provided that the total amount of the component (A) and the component (B) accounts for 100% by weight). If the content of the polycarbonate resin (A) is less than 50% by weight, the impact resistance of the reinforced thermoplastic resin composition will decline. If the content of the polycarbonate resin (A) exceeds 90% by weight, the moldability of the reinforced thermoplastic resin composition will decline.

<Graft Copolymer Mixture (B)>

The graft copolymer mixture (B) is a reaction product obtained by graft-polymerizing an aromatic alkenyl compound monomer unit (a) and a vinyl cyanide compound monomer unit (b) onto a rubber polymer (B1). The graft copolymer mixture (B) includes a graft copolymer (B') in which a graft polymer (B2) having the aromatic alkenyl compound monomer unit (a) and the vinyl cyanide compound monomer unit (b) is graft-polymerized onto a rubber polymer (B1), and a polymer (B") having the aromatic alkenyl compound monomer unit (a) and the vinyl cyanide compound monomer unit (b), but does not have a rubber polymer (B1).

[Acetone-Insoluble Fraction and Acetone-Soluble Fraction of Graft Copolymer Mixture (B)]

The graft copolymer mixture (B) includes an "acetone-insoluble fraction" which is insoluble in acetone and an "acetone-soluble fraction" which is soluble in acetone.

The acetone-insoluble fraction includes a graft copolymer (B') in which a graft polymer (B2) having the aromatic alkenyl compound monomer unit (a) and the vinyl cyanide compound monomer unit (b) is graft-polymerized onto a rubber polymer (B1).

The acetone-soluble fraction includes a polymer (B") having the aromatic alkenyl compound monomer unit (a) and the vinyl cyanide compound monomer unit (b), but does not have a rubber polymer (B1). The above polymer (B") is a polymer composed of the same monomers as those constituting the graft polymer (B2), but is not graft-polymerized onto the rubber polymer (B1).

[Rubber Polymer (B1)]

Examples of the rubber polymer (B1) in the graft copolymer mixture (B) include a butadiene rubber, a styrene-butadiene rubber, an acrylonitrile-butadiene rubber, an isoprene rubber, a chloroprene rubber, a butyl rubber, an ethylene-propylene rubber, an ethylene-propylene-nonconjugated diene rubber, an epichrolohydrin rubber, a diene-acrylic composite rubber, and a silicone (polysiloxane)-acrylic composite rubber. Among these, a butadiene rubber, a styrene-butadiene rubber, an acrylonitrile-butadiene rubber, an acrylic rubber, a diene-acrylic composite rubber and a silicone-acrylic composite rubber are preferred as they provide excellent plating properties of the molded article formed from the aforementioned reinforced thermoplastic resin composition.

Here, the diene component of the above diene-acrylic composite rubber contains at least 50% by weight of butadiene units. Specific examples thereof include a butadiene rubber, a styrene-butadiene rubber and an acrylonitrile-butadiene rubber.

The acrylic rubber component in the diene-acrylic composite rubber is prepared by polymerization between an alkyl (meth)acrylate (f) and a polyfunctional monomer (g).

In the present description, the term "(meth)acrylate" is a generic term that includes either or both of the acrylate having a hydrogen atom bonded to the α-position and the methacrylate having a methyl group bonded to the α-position.

Here, examples of the alkyl (meth)acrylate (f) include alkyl acrylates such as methyl acrylate, ethyl acrylate, n-propyl acrylate, n-butyl acrylate and 2-ethylhexyl acrylate; and alkyl methacrylates such as hexyl methacrylate, 2-ethylhexyl methacrylate and n-lauryl methacrylate. One type of these may be used alone, or two or more types thereof may be used in combination.

Examples of the polyfunctional monomer (g) include allyl methacrylate, ethylene glycol dimethacrylate, propylene glycol dimethacrylate, 1,3-butylene glycol dimethacrylate, 1,4-butylene glycol dimethacrylate, triallyl cyanurate and triallyl isocyanurate. One type of these may be used alone, or two or more types thereof may be used in combination.

Examples of the composite structure of the diene-acrylic composite rubber include a core shell structure in which the periphery of a core layer of a diene-based rubber is covered by an alkyl (meth)acrylate-based rubber, a core shell structure in which the periphery of a core layer of an alkyl (meth)acrylate-based rubber is covered by a diene-based rubber, a structure in which a diene-based rubber and an alkyl (meth)acrylate-based rubber are intertwined with each other, and a copolymer structure in which diene-based monomers and alkyl (meth)acrylate-based monomers are randomly arranged.

The silicone component of the above silicone-acrylic composite rubber is mainly composed of a polyorganosiloxane. Of these, a polyorganosiloxane containing a vinyl polymerizable functional group is preferred. The acrylic rubber component in the silicone-acrylic composite rubber is the same as the acrylic rubber component of the diene-acrylic composite rubber.

Examples of the composite structure of the silicone-acrylic composite rubber include a core shell structure in which the periphery of a core layer of a polyorganosiloxane rubber is covered by an alkyl (meth)acrylate-based rubber, a core shell structure in which the periphery of a core layer of an alkyl (meth)acrylate-based rubber is covered by a polyorganosiloxane rubber, a structure in which a polyorganosiloxane rubber and an alkyl (meth)acrylate-based rubber are intertwined with each other, and a structure in which polyorganosiloxane segments and polyalkyl (meth)acrylate segments are linearly and sterically bound to each other to form a network-like rubber structure.

The rubber polymer (B1) is prepared by, for example, treating the monomers constituting the rubber polymer (B1) with a radical polymerization initiator to effect emulsion polymerization. According to the preparation method by emulsion polymerization, the particle size of the rubber polymer (B1) can be readily controlled.

The average particle size of the rubber polymer (B1) is preferably from 0.1 to 0.6 μm as the impact resistance of the reinforced thermoplastic resin composition can be improved.

In addition, the content of the rubber polymer (B1) is preferably from 5 to 25% by weight, relative to 100% by weight of the main resin component (C). If the content of the rubber polymer (B1) is at least 5% by weight, the impact resistance of the reinforced thermoplastic resin composition can be improved. If the content is not more than 25% by weight, the moldability will be improved, and consequently, the molded article will have excellent outer appearance.

[Graft Polymer (B2)]

The graft polymer (B2) is a polymer portion in the aforementioned graft copolymer (B') which includes the aromatic alkenyl compound monomer unit (a) and the vinyl cyanide compound monomer unit (b) as essential components and a monomer unit (c) copolymerizable with these units as an optional component. The composition ratio thereof is not particularly limited, although it is preferable such that the aromatic alkenyl compound monomer unit (a) accounts for 50 to 90% by weight, the vinyl cyanide compound monomer unit (b) accounts for 10 to 50% by weight, and the monomer unit (c) accounts for 0 to 40% by weight (provided that the total amount of (a), (b), and (c) accounts for 100% by weight), as such a ratio offers an excellent balance between the impact resistance and the moldability.

Examples of the aromatic alkenyl compound monomer unit (a) include styrene, α-methylstyrene and vinyltoluene, styrene is preferred.

Examples of the vinyl cyanide compound monomer unit (b) include acrylonitrile and methacrylonitrile, and acrylonitrile is preferred.

Examples of the monomer unit (c) which is copolymerizable with these components include methacrylic acid esters such as methyl methacrylate, ethyl methacrylate and 2-ethylhexyl methacrylate, acrylic acid esters such as methyl acrylate, ethyl acrylate and butyl acrylate, and maleimide compounds such as N-phenylmaleimide.

A single type of these graft copolymer mixtures (B) may be used alone, or two or more types thereof may be used in combination.

[Polymer (B")]

The above polymer (B") is a polymer which includes the aromatic alkenyl compound monomer unit (a) and the vinyl cyanide compound monomer unit (b) as essential components and may also include a monomer unit (c) copolymerizable with these units as an optional component. The above polymer (B") is produced at the same time when graft-polymerizing the aromatic alkenyl compound monomer unit (a), the vinyl cyanide compound monomer unit (b) and the like onto the rubber polymer (B1).

It is preferable that the graft copolymer mixture (B) contain 70 to 99% by weight of an acetone-insoluble fraction, and also the reduced viscosity of an acetone-soluble fraction measured in a 0.2 g/dl N,N-dimethylformamide solution at 25° C. is 0.3 to 0.7 dl/g. If the acetone-insoluble fraction accounts for at least 70% by weight, the outer appearance of the molded product and the moldability of the reinforced thermoplastic resin composition will be further improved. On the other hand, if the acetone-insoluble fraction accounts for 99% by weight or less, the tear strength of the reinforced thermoplastic resin composition will be improved.

Moreover, if the above reduced viscosity of the acetone-soluble fraction is 0.3 dl/g or higher, the tear strength of the reinforced thermoplastic resin composition will be improved. If it is 0.7 dl/g or lower, the outer appearance of the molded product and the moldability of the reinforced thermoplastic resin composition will be further improved.

It should be noted that the measurement method of the acetone-soluble fraction is as follows.

2.5 g of a graft copolymer mixture is immersed in 90 ml of acetone, heated at 65° C. for 3 hours, and then centrifuged at 1,500 rpm for 30 minutes by using a centrifugal separator. Thereafter, the supernatant liquid is discarded. The residue is dried at 65° C. for 12 hours in a vacuum drier, and the resulting sample after drying is precisely weighed. From the weight difference between before and after this process (namely, [2.5 g of graft copolymer mixture]−[sample weight after drying]), the content ratio (%) of the acetone-soluble fraction relative to the graft copolymer mixture can be determined.

The reduced viscosity is measured in a 0.2 g/dl N,N-dimethylformamide solution at 25° C.

[Production Method of Graft Copolymer Mixture (B)]

The graft copolymer mixture (B) can be obtained by graft-polymerizing the aromatic alkenyl compound monomer (a) and the vinyl cyanide compound monomer (b), and, if necessary, an additional monomer (c), onto the rubber polymer (B1).

There are no limitations on the polymerization method for the graft copolymer mixture (B), although an emulsion polymerization method is preferred. In addition, various chain transfer agents may also be added during the graft polymerization, so as to adjust the molecular weight and the graft rate of the graft copolymer mixture (B).

[Content of Graft Copolymer Mixture (B)]

The content of the graft copolymer mixture (B) in the main resin component (C) is from 10 to 50% by weight, and preferably from 10 to 20% by weight (provided that the total amount of the component (A) and the component (B) accounts for 100% by weight). If the content of the graft copolymer mixture (B) in the main resin component (C) is less than 10% by weight, the moldability of the reinforced thermoplastic resin composition will be unsatisfactory. If the content exceeds 50% by weight, the flame retardancy of the reinforced thermoplastic resin composition will decline.

<Inorganic Filler (D) Surface-Treated with Water-Soluble Polyamide>

The inorganic filler (D) surface-treated with a water-soluble polyamide can be obtained by carrying out a surface treatment in which the surface of an untreated inorganic filler is coated with a water-soluble polyamide.

Examples of the untreated inorganic filler include inorganic fibers such as glass fibers and carbon fibers, inorganic materials such as metal-coated inorganic fibers, wollastonite, talc, mica, glass flakes, glass beads, potassium titanate, calcium carbonate, magnesium carbonate, carbon black and Ketjen Black, metals and alloys such as iron, copper, zinc and aluminum, and oxides thereof in forms of fibers and powders. Those in the form of fibers are preferred as untreated inorganic fillers, and of these, carbon fibers are preferred since they provide high rigidity even when used in a small amount. In addition, chopped fibers are even more preferable among the carbon fibers.

A single type of these inorganic fillers (D) may be used alone, or two or more types thereof may be used in combination.

Examples of the water-soluble polyamides include polyamides having a tertiary amine within the main chain or side chain, and polyamides having a polyalkylene glycol component within the main chain.

In order to obtain a polyamide having a tertiary amine, monomers containing a tertiary amine in the main chain (such as aminoethyl piperazine and bis-aminopropyl piperazine) and monomers containing a tertiary amine in the side chain (such as a-dimethylamino ϵ-caprolactam) may be used.

A water-soluble polyamide further added with a surfactant is more preferable. Examples of the surfactant include betaine-based surfactants.

As such water-soluble polyamides, for example, "KP2007" and "KP2021A" manufactured by Matsumoto Yushi-Seiyaku Co., Ltd., "AQ nylon" manufactured by Toray Fine Chemicals Co., Ltd., and the like are commercially available.

The content of the inorganic filler (D) surface-treated with a water-soluble polyamide is from 6 to 22 parts by weight, and preferably from 6 to 20 parts by weight, relative to 100 parts by weight of the main resin component (C). If the content of the inorganic filler (D) surface-treated with a water-soluble polyamide is less than 6 parts by weight, the rigidity of the reinforced thermoplastic resin composition or the like cannot be improved sufficiently. If the content exceeds 22 parts by weight, the moldability of the reinforced thermoplastic resin composition will decline.

<Impact Resistance Improver (F)>

The reinforced thermoplastic resin composition of the present invention may contain a polyester resin as an impact resistance improver (F). The polyester resin is mainly composed of an aromatic dicarboxylic acid unit of 8 to 22 carbon atoms and either an alkylene glycol unit of 2 to 22 carbon atoms or a cycloalkylene glycol unit, wherein the total amount of these constituent units accounts for 50% by weight or higher. In addition, the polyester resin may also contain, if necessary, an aliphatic dicarboxylic acid such as adipic acid and sebacic acid, or a polyalkylene glycol such as polyethylene glycol and polytetramethylene glycol, as a constituent unit.

Preferred examples of the polyester resin include polyethylene terephthalate, polybutylene terephthalate, polytetramethylene terephthalate and polybutylene naphthalate. A single type of these polyester resins may be used alone, or two or more types thereof may be used in combination.

The content of the impact resistance improver (F) in the reinforced thermoplastic resin composition is preferably from 1 to 10 parts by weight, and more preferably from 3 to 7 parts by weight, relative to 100 parts by weight of the main resin component (C). If the content of the impact resistance improver (F) is at least 1 part by weight, the impact resistance of the reinforced thermoplastic resin composition can be improved sufficiently. If the content is not more than 10 parts by weight, the moldability of the reinforced thermoplastic resin composition can be ensured.

<Surface Appearance Improver (G)>

The reinforced thermoplastic resin composition of the present invention may contain a glycidyl ether unit-containing polymer as a surface appearance improver (G). Examples of the glycidyl ether unit-containing polymer include glycidyl ether-type epoxy resins yielded by a reaction between a compound having a hydroxy group and epichlorohydrin.

Examples of the glycidyl ether-type epoxy resins include high molecular weight substances such as bisphenol type epoxy resins, novolac type epoxy resins, polyglycidyl ethers of aliphatic polyhydric alcohols, and biphenyl type epoxy resins, which have a polymer with repeating units represented by the following formula (1) (for example, an epoxy group-containing phenoxy resin).

[Chemical Formula 1]

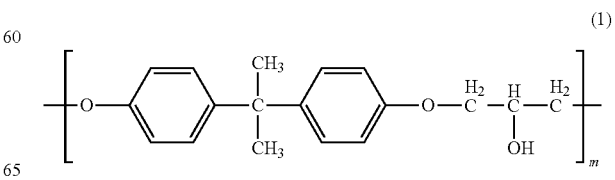

(m represents an integer of 1 or more)

Furthermore, examples of the bisphenol type epoxy resins include a bisphenol A type epoxy resin, a bisphenol F type epoxy resin, a bisphenol AD type epoxy resin, and an epoxy resin having structures of both bisphenol A and bisphenol F.

Examples of the novolac type epoxy resins include a phenol novolac type epoxy resin and a cresol novolac type epoxy resin.

Examples of the polyglycidyl ethers of aliphatic polyhydric alcohols include alkylene glycol diglycidyl ethers (such as ethylene glycol diglycidyl ether), polyoxyalkylene glycol diglycidyl ethers (such as diethylene glycol diglycidyl ether, polyethylene glycol diglycidyl ether, dipropylene glycol diglycidyl ether, tripropylene glycol diglycidyl ether, and polypropylene glycol diglycidyl ether), and glycerin triglycidyl ether.

A single type of these glycidyl ether-type epoxy resins may be used alone, or two or more types thereof may be used in combination.

A bisphenol A type epoxy resin, a bisphenol F type epoxy resin, an epoxy resin having structures of both bisphenol A and bisphenol F, a phenol novolac type epoxy resin, a cresol novolac type epoxy resin, and an epoxy group-containing phenoxy resin are preferred as the glycidyl ether unit-containing polymers. By using these preferred polymers, the surface appearance will be further improved.

As the glycidyl ether unit-containing polymer, those in the form of a liquid, a semisolid or a solid at normal temperature (20° C.) may be used, although those in a solid state are preferred considering the workability during the extrusion process.

As the glycidyl ether unit-containing polymer, for example, "jER" series manufactured by Japan Epoxy Resins Co., Ltd., "Epototo" series and "Phenototo" series manufactured by Tohto Kasei Co., Ltd., "AER" series manufactured by Asahi Kasei Chemicals Corporation, "Epiclon" series manufactured by Dainippon Ink and Chemicals, Incorporated, and the like are commercially available.

The content of the surface appearance improver (G) in the reinforced thermoplastic resin composition is preferably from 1 to 12 parts by weight, and more preferably from 3 to 9 parts by weight, relative to 100 parts by weight of the main resin component (C). If the content of the surface appearance improver (G) is at least 1 part by weight, the surface appearance of the molded article obtained from the reinforced thermoplastic resin composition can be improved sufficiently. If the content is not more than 12 parts by weight, the moldability of the reinforced thermoplastic resin composition can be ensured.

<Phosphoric Acid Ester-Based Flame Retardant (E)>

The reinforced thermoplastic resin composition of the present invention may contain a phosphoric acid ester-based flame retardant (E).

The phosphoric acid ester-based flame retardant is a compound represented by the following formula (2).

[Chemical Formula 2]

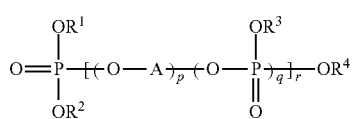

(2)

(Each of $R^1$, $R^2$, $R^3$ and $R^4$ independently represents a hydrogen atom or an organic group, provided that not all the $R^1$, $R^2$, $R^3$ and $R^4$ are hydrogen atoms. A represents a divalent or higher organic group, p represents 0 or 1, q represents an integer of 1 or more, and r represents an integer of 0 or more.)

Examples of the organic group include an alkyl group which may be substituted (such as a methyl group, an ethyl group, a butyl group and an octyl group), a cycloalkyl group (such as a cyclohexyl group), and an aryl group (such as a phenyl group and an alkyl group-substituted phenyl group). In addition, the number of substituents, if any, is not limited. Examples of the substituted organic group include an alkoxy group, an alkylthio group, an aryloxy group and an arylthio group. In addition, the organic group may be a group in which these substituents are combined (such as an arylalkoxyalkyl group) or a group in which these substituents are combined by bonding through an oxygen atom, a nitrogen atom, a sulfur atom or the like (such as an arylsulfonyl aryl group).

Further, the term "divalent or higher organic group" refers to a divalent or higher functional group obtained by removing two or more hydrogen atoms bonded to carbon atom(s) in the above-mentioned organic group. Examples thereof include an alkylene group and a (substituted) phenylene group. Hydrogen atoms at any position may be removed from the carbon atom(s).

Specific examples of the phosphoric acid ester-based flame retardant (E) include trimethyl phosphate, triethyl phosphate, tributyl phosphate, trioctyl phosphate, tributoxyethyl phosphate, triphenyl phosphate, tricresyl phosphate, trixyl phosphate, cresyl diphenyl phosphate, xyl diphenyl phosphate, octyl diphenyl phosphate, diphenyl-2-ethylcresyl phosphate, tris(isopropylphenyl) phosphate and resorcinyl diphenyl phosphate.

In addition, other examples include polyphosphates such as bisphenol A-bis(dicresyl phosphate), phenylenebis(diphenyl phosphate), phenylenebis(ditolyl phosphate) and phenylenebis(dixylyl phosphate), including bisphenol A bisphosphates, hydroquinone bisphosphates, resorcin bisphosphates and trioxybenzene triphosphates.

A single type of these phosphoric acid ester-based flame retardant (E) may be used alone, or two or more types thereof may be used in combination.

Of the above specific examples, trixyl phosphate, phenylenebis(diphenyl phosphate), phenylenebis(dixylyl phosphate), phenylenebis(ditolyl phosphate) and bisphenol A-bis (dicresyl phosphate) are preferred, and phenylenebis (diphenyl phosphate) and phenylenebis(dixylyl phosphate) are more preferred as the phosphoric acid ester-based flame retardant (E).

Of the phosphoric acid ester-based flame retardants (E), polyphosphates can be obtained by, for example, dehydration and condensation between various diol forms such as polynuclear phenols (for example, bisphenol A) and an orthophosphoric acid. Examples of the diol forms include hydroquinone, resorcinol, diphenylolmethane, diphenyloldimethylmethane, dihydroxybiphenyl, p,p'-dihydroxy diphenyl sulfone and dihydroxynaphthalene.

The weight average molecular weight of the phosphoric acid ester-based flame retardant (E) is preferably at least 326, and more preferably at least 550. If the weight average molecular weight at least 326, satisfactory flame retardancy can be achieved. Further, if a phosphoric acid ester-based flame retardant having a weight average molecular weight of at least 550 is used, the moldability will be improved, the gas emission during the molding process can be reduced further, and a molded article having excellent outer appearance can be obtained. The upper limit of the weight average molecular weight of the phosphoric acid ester-based flame retardant is preferably not more than 800, and more preferably not more than 690, from the viewpoint of the flame retardancy of the obtained reinforced thermoplastic resin composition.

The phosphoric acid ester-based flame retardant (E) is commercially available, and examples of such commercial products include "FP" series manufactured by Adeka Corporation, "Kronitex" series manufactured by Ajinomoto Fine-Techno Co., Inc., "Reofos" series manufactured by Chemtura Japan Ltd., and "CR" series and "PX" series manufactured by Daihachi Chemical Industry Co., Ltd.

The content of the phosphoric acid ester-based flame retardant (E) is preferably from 1 to 40 parts by weight, and more preferably from 1 to 25 parts by weight, relative to 100 parts by weight of the main resin component (C). If the content of the phosphoric acid ester-based flame retardant (E) is at least 1 part by weight, sufficiently high surface impact strength can be achieved. If the content of the phosphoric acid ester-based flame retardant (E) is 40 parts by weight or lower, the thermal resistance and flame retardancy can be secured satisfactorily. In addition, if the content of the phosphoric acid ester-based flame retardant (E) is within the above range, the surface impact strength determined by a falling ball test can be improved further, due to the synergistic effect with the inorganic filler surface-treated with a water-soluble polyamide.

<Other Flame Retardants>

The reinforced thermoplastic resin composition of the present invention may also contain a known non-halogenated flame retardant, in addition to the phosphoric acid ester-based flame retardant (E) so that the both agents can be used in combination. Examples of the non-halogenated flame retardants include inorganic flame retardants such as red phosphorus and aluminum hydroxide.

The red phosphorus-based flame retardant can be used after stabilization by coating with a thermosetting resin either with or without metal hydroxide. Since the red phosphorus-based flame retardant is flammable on its own, it may be mixed with at least a part of the main resin component (C) or the polycarbonate resin (A) in advance to form a master batch.

<Flame Retardant Auxiliary Agent>

The reinforced thermoplastic resin composition of the present invention may also contain a flame retardant auxiliary agent (H) to prevent dripping during combustion. Examples of the flame retardant auxiliary agents include polytetrafluoroethylene, tetrafluoroethylene-containing compounds, and silicone-based polymers.

If polytetrafluoroethylene or a tetrafluoroethylene-containing compound is incorporated as the flame retardant auxiliary agent, the amount thereof is preferably 0.5 parts by weight or lower, relative to 100 parts by weight of the main resin component (C), from the viewpoint of the surface appearance.

<Other Components>

The reinforced thermoplastic resin composition of the present invention may also contain another modifier, a mold release agent, a light or thermal stabilizer, an antistatic agent, a dye, a pigment, or the like, if necessary.

<Production Method>

The reinforced thermoplastic resin composition of the present invention can be obtained by mixing the polycarbonate resin (A), the graft copolymer mixture (B) and the inorganic filler (D) which has been surface-treated with a water-soluble polyamide, and, if necessary, other components such as phosphoric acid ester-based flame retardant (E), using a mixing device (for example, a Henschel mixer, tumbler mixer, Nauta mixer or the like). The mixture may also be further kneaded using a kneading device (for example, a single screw extruder, a twin screw extruder, a Banbury mixer, a co-kneader, or the like).

As described above, the reinforced thermoplastic resin composition of the present invention containing the polycarbonate resin (A), the graft copolymer mixture (B) and the inorganic filler (D) which has been surface-treated with a water-soluble polyamide exhibits excellent moldability, and also being capable of improving the drop impact resistance (surface impact strength determined by a falling ball test) when dropping the product.

In addition, the reinforced thermoplastic resin composition of the present invention generates a minimal amount of gas during molding, since it does not need to contain a lubricant as an essential component. Furthermore, since it is composed of resin materials, the resulting molded article exhibits excellent rigidity.

<Molded Article>

The molded article of the present invention is formed through molding and processing of the above-mentioned reinforced thermoplastic resin composition.

Examples of the molding and processing method of the reinforced thermoplastic resin composition include an injection molding method, an injection compression molding method, an extrusion molding method, a blow molding method, a vacuum molding method, an air-pressure molding method, a calendar molding method and an inflation molding method. Among these, an injection molding method and an injection compression molding method are preferred, since they are superior in terms of mass production and are capable of yielding molded articles of highly precise dimensions.

The molded article of the present invention can be applied to, for example: housings of a personal computer (including a laptop type), a projector (including a liquid crystal projector), a television set, a printer, a fax machine, a copying machine, audio equipment, a game machine, a camera (including a video camera, a digital camera, and the like), filming equipment such as video equipment, musical instruments, a portable device (such as an electronic diary and a personal digital assistant (PDA)), lighting equipment, and a communication device such as a telephone (including a mobile phone); fishing goods; play equipment such as pinball goods; products for vehicles; products for furniture; products for sanitation; and products for building materials. Among these applications, suitable application is a housing of an electronic part of a laptop personal computer, a portable device, or the like because the effects of the present invention can be especially exploited.

EXAMPLES

Hereunder, specific examples are shown. The present invention is in no way limited by these examples. In addition, in the following description, the units "parts" and "%" refer to "parts by weight" and "% by weight", respectively.

In the following example, the following components were used.

[Polycarbonate Resin (A)]

The "Novarex 7021PJ" manufactured by Mitsubishi Engineering-Plastics Corporation was used as the polycarbonate resin (A).

[Production of Graft Copolymer Mixture (B1-1)]

2 parts (in terms of solid content) of a copolymer latex having an average particle size of 0.08 µm consisting of 85% of an n-butyl acrylate unit and 15% of a methacrylic acid unit were added, with stirring, to 100 parts (in terms of solid content) of a polybutadiene latex having an average particle size of 0.08 µm at a solid content concentration of 35%. Subsequently, the mixture was kept stirred for 30 minutes, thereby yielding an enlarged butadiene-based rubber polymer latex having an average particle size of 0.28 μm.

The yielded enlarged butadiene-based rubber polymer latex was placed in a reaction vessel, to which 100 parts of distilled water, 4 parts of a wood rosin emulsifier, 0.4 parts of Demol N (product name of naphthalene sulfonate formaldehyde condensate manufactured by Kao Corporation), 0.04 parts of sodium hydroxide, and 0.7 parts of dextrose were further added. Subsequently, the mixture was heated under stirring. When the internal temperature reached 60° C., 0.1 part of ferrous sulfate, 0.4 parts of sodium pyrophosphate, and 0.06 parts of sodium dithionite were added. Then, a mixture containing the following components was continuously added dropwise over 90 minutes. The resultant product was allowed to stand for 1 hour and then was cooled down.

| | |
|---|---|
| Acrylonitrile | 30 parts |
| Styrene | 70 parts |
| Cumene hydroperoxide | 0.4 parts |
| tert-dodecylmercaptan | 1 part |

The thus yielded graft copolymer mixture latex was coagulated with dilute sulfuric acid. The coagulated product was then washed, filtered, and dried, thereby yielding a graft copolymer mixture (B1-1) in the form of a dried powder.

The acetone-soluble fraction of this graft copolymer mixture (B1-1) was 27%. In addition, the reduced viscosity of this acetone-soluble fraction was 0.3 dl/g.

It should be noted that the method for measuring the acetone-soluble fraction is as follows.

2.5 g of a graft copolymer mixture was immersed in 90 ml of acetone, heated at 65° C. for 3 hours, and then centrifuged at 1,500 rpm for 30 minutes by using a centrifugal separator. Thereafter, the supernatant liquid was discarded. The residue was dried at 65° C. for 12 hours in a vacuum drier, and the resulting sample after drying was precisely weighed. From the weight difference between before and after this process (namely, [2.5 g of graft copolymer mixture]−[sample weight after drying]), the content ratio (%) of the acetone-soluble fraction relative to the graft copolymer mixture was determined.

The reduced viscosity was measured in a 0.2 g/dl N,N-dimethylformamide solution at 25° C.

[Production of Graft Copolymer Mixture (B1-2)]

Raw materials at the following proportions were charged in a reaction vessel and polymerized under stirring with nitrogen substitution at 50° C. for 4 hours, thereby yielding a rubber latex.

| | |
|---|---|
| n-butyl acrylate | 98 parts |
| 1,3-butylene glycol dimethacrylate | 1 part |
| Allyl methacrylate | 1 part |
| Sodium dioctylsulfosuccinate | 2.0 parts |
| Deionized water | 300 parts |
| Potassium persulfate | 0.3 parts |
| Disodium phosphate dodecahydrate | 0.5 parts |
| Sodium hydrogen phosphate dodecahydrate | 0.3 parts |

100 parts (in terms of solid content) of the thus yielded rubber latex was charged in a separate reaction vessel and diluted by adding 280 parts of ion exchanged water thereto, and the resulting diluted product was heated to 70° C.

Separately, 0.7 parts of benzoyl peroxide was dissolved in 100 parts of a monomer mixture composed of acrylonitrile/styrene=29/71 (weight ratio), and the mixture was subjected to nitrogen substitution. Then, this monomer mixture was added at a rate of 30 parts/hour by a metering pump into the reaction vessel which contained the above-mentioned rubber latex. After all the monomers were added, the temperature inside the reaction vessel was raised to 80° C., and the mixture was kept stirred for 30 minutes, thereby yielding a graft copolymer mixture latex. The polymerization rate was 99%.

The above graft copolymer mixture latex was charged into a coagulation bath which contained an aqueous solution of 0.15% aluminum chloride ($AlCl_3 \cdot 6H_2O$) (90° C.) at a three times greater amount than the total amount of the latex, under stirring to effect coagulation. After all the latex was added, the temperature inside the coagulation bath was raised to 93° C., and the mixture was allowed to stand for 5 minutes. This was cooled down, and then liquid was removed therefrom by a centrifugal separator. The resulting product was washed and then dried, thereby yielding a graft copolymer mixture (B1-2) in the form of a dried powder.

The acetone-soluble fraction of this graft copolymer mixture (B1-2) was 21%. In addition, the reduced viscosity of this acetone-soluble fraction was 0.70 dl/g.

[Production of Graft Copolymer Mixture (B1-3)]

A graft copolymer mixture (B1-3) including a composite rubber of polybutadiene/polybutyl acrylate as a rubber polymer was obtained by the method described below.

0.4 parts (in terms of solid content) of a copolymer latex having an average particle size of 0.10 nm composed of 82% of an n-butyl acrylate unit and 18% of a methacrylic acid unit were added, with stirring, to 20 parts (in terms of solid content) of a polybutadiene latex having an average particle size of 0.08 μm at a solid content concentration of 35%. Subsequently, the mixture was kept stirred for 30 minutes, thereby yielding an enlarged diene-based rubber latex having an average particle size of 0.36 μm.

20 parts (in terms of solid content) of the thus yielded enlarged diene-based rubber latex were placed in a reaction vessel, to which 1 part of disproportionated potassium rosinate, 150 parts of ion exchanged water, and a monomer mixture having the following composition were added. The resulting product was subjected to nitrogen substitution and then heated to 50° C. (internal temperature). Furthermore, a solution having 0.0002 parts of ferrous sulfate, 0.0006 parts of disodium ethylenediaminetetraacetate, and 0.25 parts of Rongalite dissolved in 10 parts of ion exchanged water was added into the reaction vessel, to effect a reaction.

n-butyl acrylate 80 parts
Allyl methacrylate 0.32 parts
Ethylene glycol dimethacrylate 0.16 parts The internal temperature at the completion of the reaction was 75° C. The solution was further heated up to 80° C., and the reaction was kept continued for 1 hour, thereby yielding a composite rubber of the enlarged diene-based rubber and the polybutyl acrylate-based rubber. The polymerization rate was 98.8%.

Subsequently, 50 parts (in terms of solid content) of the composite rubber latex of the enlarged diene-based rubber and the polybutyl acrylate-based rubber were placed in a reaction vessel, which was then diluted by adding 140 parts of ion exchanged water thereto. The resulting diluted solution was heated to 70° C.

Separately, 0.35 parts of benzoyl peroxide were dissolved in 50 parts of a monomer mixture composed of acrylonitrile/styrene=29/71 (weight ratio), and the mixture was subjected to nitrogen substitution. This monomer mixture was added at a rate of 15 parts/hour by a metering pump into the reaction vessel which contained the above-mentioned rubber latex. After all the monomers were added, the temperature inside the reaction vessel was raised to 80° C., and the mixture was kept stirred for 30 minutes, thereby yielding a graft copolymer mixture latex. The polymerization rate was 99%.

The above graft copolymer mixture latex was charged into a coagulation bath which contained a 0.5% aqueous solution of sulfuric acid (90° C.) at a three times greater amount than the total amount of the latex, under stirring to effect coagulation. After all the latex was added, the temperature inside the coagulation bath was raised to 93° C., and the mixture was allowed to stand for 5 minutes. This was cooled down, and then liquid was removed therefrom by a centrifugal separator. The resulting product was washed and then dried, thereby yielding a graft copolymer mixture (B1-3) in the form of a dried powder.

The acetone-soluble fraction of this graft copolymer mixture (B1-3) was 20%. In addition, the reduced viscosity of this acetone-soluble fraction was 0.7 dl/g.

[Production of Graft Copolymer Mixture (B1-4)]

A graft copolymer mixture (B1-4) including a composite rubber of polysiloxane rubber/polybutyl acrylate as a rubber polymer was obtained by the method described below.

96 parts of octamethyltetracyclosiloxane, 2 parts of γ-methacryloxypropyldimethoxymethylsilane, and 2 parts of ethyl orthosilicate were mixed to yield 100 parts of a siloxane-based mixture. 300 parts of distilled water having 0.67 parts of sodium dodecylbenzene sulfonate dissolved therein were added to this mixture. The resulting mixture was stirred by a homomixer at 10000 revolutions/2 minutes, and was then homogenized once at a pressure of 30 MPa by a homogenizer, thereby yielding a stable premixed organosiloxane latex.

In addition, 2 parts of dodecylbenzenesulfonate and 98 parts of distilled water were charged in a reaction vessel equipped with a reagent injection container, a cooling tube, a jacket heater and a stirring device, by which an aqueous solution of 2% dodecylbenzenesulfonate was prepared. While heating this aqueous solution to 85° C., the premixed organosiloxane latex was dropwise added thereto over 4 hours. After the completion of the dropwise addition, the solution was kept at this temperature for 1 hour, and was then cooled down.

The reaction solution was allowed to stand at room temperature for 48 hours and was then neutralized with an aqueous solution of sodium hydroxide, thereby yielding a polyorganosiloxane latex (L-1). A portion of the polyorganosiloxane latex (L-1) was dried at 170° C. for 30 minutes to obtain the solid content concentration. The thus obtained solid content concentration was 17.3%.

Subsequently, 119.5 parts of the polyorganosiloxane latex (L-1) and 0.8 parts of sodium polyoxyethylene alkyl phenyl ether sulfate were charged in a reaction vessel equipped with a reagent injection container, a cooling tube, a jacket heater, and a stirring device. Subsequently, 203 parts of distilled water was added and mixed therein. Then, a mixture composed of 53.2 parts of n-butyl acrylate, 0.21 parts of allyl methacrylate, 0.11 parts of 1,3-butylene glycol dimethacrylate, and 0.13 parts of tertiary butyl hydroperoxide was added thereto. A nitrogen gas was let to flow through this reaction vessel so as to substitute the inside atmosphere with nitrogen, and the temperature was raised to 60° C. When the internal temperature of the reaction vessel reached 60° C., an aqueous solution having 0.0001 parts of ferrous sulfate, 0.0003 parts of disodium ethylenediaminetetraacetate, and 0.24 parts of Rongalite dissolved in 10 parts of distilled water was added to initiate radical polymerization. Due to the polymerization of the acrylate components, the temperature of the solution increased to 78° C. This state was maintained for 1 hour to complete the polymerization of the acrylate components, thereby yielding a composite rubber latex of polyorganosiloxane and a butyl acrylate rubber.

After the solution temperature inside the reaction vessel decreased to 60° C., an aqueous solution having 0.4 parts of Rongalite dissolved in 10 parts of distilled water was added. Subsequently, a mixed solution including 11.1 parts of acrylonitrile, 33.2 parts of styrene, and 0.2 parts of tertiary butyl hydroperoxide was dropwise added thereto over about 1 hour to effect polymerization. After the completion of the dropwise addition, the resulting mixture was allowed to stand for 1 hour, and an aqueous solution having 0.0002 parts of ferrous sulfate, 0.0006 parts of disodium ethylenediaminetetraacetate, and 0.25 parts of Rongalite dissolved in 10 parts of distilled water was then added thereto. Subsequently, a mixed solution including 7.4 parts of acrylonitrile, 22.2 parts of styrene, and 0.1 parts of tertiary butyl hydroperoxide was dropwise added thereto over about 40 minutes to effect polymerization. After the completion of the dropwise addition, the resulting mixture was allowed to stand for 1 hour, and was then cooled down, thereby yielding a graft copolymer mixture latex in which an acrylonitrile-styrene copolymer was grafted onto the composite rubber composed of polyorganosiloxane and the butyl acrylate rubber.

Subsequently, 150 parts of a 5% aqueous solution of calcium acetate was heated to 60° C. and stirred. 100 parts of the graft copolymer mixture latex was gradually dropwise added into this aqueous solution of calcium acetate to effect coagulation. The resulting coagulated product was separated, washed, and then dried, thereby yielding a graft copolymer mixture (B1-4) in the form of a dried powder.

The acetone-soluble fraction of this graft copolymer mixture (B1-4) was 26%. In addition, the reduced viscosity of this acetone-soluble fraction was 0.60 dl/g.

[Impact Resistance Improver (F)]

A polybutylene terephthalate resin ("NOVADURAN 5020S") manufactured by Mitsubishi Engineering-Plastics Corporation was used as the impact resistance improver (F).

[Inorganic Filler (D)]

The "TR06NE" (surface treatment agent: water-soluble polyamide) which was chopped fibers made of carbon fibers and manufactured by Mitsubishi Rayon Co., Ltd. was used as an inorganic filler (D-1).

The "HTA-C6-U" (surface treatment agent: urethane) which was chopped fibers made of carbon fibers and manufactured by Toho Tenax Co., Ltd. was used as an inorganic filler (D-2).

The "HTA-C6N" (surface treatment agent: a polyamide dissolved in methyl alcohol) which was chopped fibers made of carbon fibers and manufactured by Toho Tenax Co., Ltd. was used as an inorganic filler (D-3).

[Phosphoric Acid Ester-Based Flame Retardant (E)]

The "PX-200" (weight average molecular weight: 686) manufactured by Daihachi Chemical Industry Co., Ltd. was used as a phosphoric acid ester-based flame retardant (E-1).

The "CR-733S" (weight average molecular weight: 574) manufactured by Daihachi Chemical Industry Co., Ltd. was used as a phosphoric acid ester-based flame retardant (E-2).

The "TPP" (weight average molecular weight: 326) manufactured by Daihachi Chemical Industry Co., Ltd. was used as a phosphoric acid ester-based flame retardant (E-3).

The "BAPP" (weight average molecular weight: 692) manufactured by Ajinomoto Fine-Techno Co., Inc. was used as a phosphoric acid ester-based flame retardant (E-4).

In addition, in examples in which the flame retardancy was provided by the phosphoric acid ester-based flame retardant (E), polytetrafluoroethylene (PTFE) was added as a flame retardant auxiliary agent (H).

[Other Components]

With respect to Example 8 and Comparative Example 5 described below, the glycidyl ether unit-containing polymer "1256" manufactured by Japan Epoxy Resins Co., Ltd. was incorporated as a surface appearance improver (G).

Each of the components described above was mixed, as indicated in Tables 1 to 4, to obtain a reinforced thermoplastic resin composition. The obtained reinforced thermoplastic resin compositions were evaluated for the surface impact strength, the Charpy impact strength, the flexural modulus, the flame retardancy and the moldability in the following manners. The evaluation results are shown in Tables 1 to 4.

[Surface Impact Strength]

A test piece (100 mm×100 mm×1 mm (in thickness)) prepared by injection molding was used to perform the falling ball impact test. In the test, a testing machine for the UL1956 vertical falling ball test method was used to examine the critical fracture height when using a steel ball of 500 g.

[Charpy Impact Strength]

The Charpy impact strength was measured in accordance with ISO 179.

[Flexural Modulus]

The flexural modulus was measured in accordance with ISO 178.

[Flame Retardancy]

A test piece (having a width of 12.7 mm, a length of 127 mm and a thickness 1.0 mm) was prepared by molding the reinforced thermoplastic resin composition, and subjected to a flame test in accordance with UL94. To evaluate the flame retardancy, a vertical flame test was employed for the resin compositions of Examples 1 to 17 and Comparative Examples 1 to 7 which included the phosphoric acid ester-based flame retardant (E), and a horizontal flame test was employed for the resin compositions of Examples 18 to 19 and Comparative Examples 8 to 12 which did not include the phosphoric acid ester-based flame retardant (E).

(1) Vertical Flame Test

A burner flame was applied to the lower end of the aforementioned test piece which was vertically supported and kept there for 10 seconds, and then the burner flame was removed from the test piece. After the flame was extinguished, the burner flame was reapplied and the same operation was carried out. The evaluation was made based on the flaming combustion time after the first contact with the flame, the total of the second flaming combustion time and the flameless combustion time, and the presence or absence of fallen objects due to the combustion. The outline of the criteria for each grade in the UL94 standard is as follows.

V-0: The first flaming combustion time of not more than 10 seconds; the total of the second flaming combustion time and the flameless combustion time of not more than 30 seconds; with no fallen objects due to the combustion.

V-1: The first flaming combustion time of more than 10 seconds but not more than 30 seconds; the total of the second flaming combustion time and the flameless combustion time of more than 30 seconds but not more than 60 seconds; with no fallen objects due to the combustion.

V-2: The first flaming combustion time of more than 10 seconds but not more than 30 seconds; the total of the second flaming combustion time and the flameless combustion time of more than 30 seconds but not more than 60 seconds; with fallen objects due to the combustion.

With respect to Examples 1 to 17 and Comparative Examples 1 to 7, the flame retardancy is expressed by the following symbols in Tables 1 to 3.

A; The flame retardancy was in the V-0 level.
B; The flame retardancy was in the V-1 level.
C; The flame retardancy was in the V-2 level.
D; The flame retardancy was below the V-2 level.

(2) Horizontal Flame Test

A burner flame was applied to the end of the aforementioned test piece which was horizontally supported and kept there for 30 seconds, and then the burner flame was removed from the test piece. After the contact with the flame, the time for the flame to travel between the gauge marks (75 mm) which were marked on the test piece in advance was measured. The evaluation was made based on the combustion rate which was calculated from the result. The outline of the criteria in the UL94 standard is as follows.

HB; Extinguishment after the contact with the flame, and also the combustion rate of not more than 75 mm/min.

With respect to Examples 18 to 19 and Comparative Examples 8 to 12, the flame retardancy is expressed by the following symbols in Tables 2 and 4.

A; The flame retardancy was in the HB level.
B; The flame retardancy was below the HB level.

[Moldability]

A liquid crystal display cover (having a thickness of 1 mm) for an A4 sized laptop personal computer was molded by the injection molding machine (J350E with a 350 t accumulator, manufactured by The Japan Steel Works, LTD.) in the following molding conditions. The moldability was evaluated based on the occurrence of short shot (unfilled portions) and the occurrence of corrosion by gas during the molding.

A: No unfilled portion was observed.
B: Unfilled portions were partially observed.
C: Either one or both of unfilled portions and corrosion by gas was observed.

Molding Conditions

The molding conditions for the reinforced thermoplastic resin composition of the present invention were set such that the molding temperature was 280° C., the injection rate was 99%, and the mold temperature was 80° C. However, the molding conditions for the reinforced thermoplastic resin composition incorporated with a phosphoric acid ester-based flame retardant were set such that the molding temperature was 260° C., the injection rate was 99%, and the mold temperature was 80° C.

TABLE 1

|   |   |      |       | Example No. |      |      |      |      |      |      |      |      |
|---|---|------|-------|------|------|------|------|------|------|------|------|------|
|   |   |      |       | 1    | 2    | 3    | 4    | 5    | 6    | 7    | 8    | 9    |
| C | A |      | %     | 90   | 90   | 90   | 90   | 50   | 80   | 90   | 90   | 90   |
|   | B | B1-1 | %     |      |      |      |      |      |      |      |      |      |
|   |   | B1-2 | %     |      |      |      |      |      |      |      |      |      |
|   |   | B1-3 | %     |      |      |      |      |      |      |      |      |      |
|   |   | B1-4 | %     | 10   | 10   | 10   | 10   | 50   | 20   | 10   | 10   | 10   |
| F |   |      | parts |      |      |      |      |      |      |      |      |      |
| D-1 |   |    | parts | 11.3 | 13.4 | 13.9 | 15.6 | 13.4 | 13.4 | 6.3  | 19.6 | 21.3 |
| D-2 |   |    | parts |      |      |      |      |      |      |      |      |      |

TABLE 1-continued

| | | Example No. | | | | | | | | |
|---|---|---|---|---|---|---|---|---|---|---|
| | | 1 | 2 | 3 | 4 | 5 | 6 | 7 | 8 | 9 |
| D-3 | parts | | | | | | | | | |
| E-1 | parts | 1 | 20 | 25 | 40 | 20 | 20 | 20 | 20 | 20 |
| E-2 | parts | | | | | | | | | |
| E-3 | parts | | | | | | | | | |
| E-4 | parts | | | | | | | | | |
| G | parts | | | | | | | | | |
| H | parts | 0.5 | 0.5 | 0.5 | 0.5 | 0.5 | 0.5 | 0.5 | 0.5 | 0.5 |
| Surface impact strength | cm | 240< | 240< | 240< | 240< | 240< | 240< | 240< | 240< | 150 |
| Charpy impact strength | kJ/m$^2$ | 9 | 6 | 5 | 4 | 12 | 7 | 7 | 6 | 6 |
| Flexural modulus | MPa | 7,900 | 8,400 | 8,800 | 9,000 | 6,600 | 8,500 | 5,600 | 11,100 | 12,000 |
| Flame retardancy | — | B | A | A | C | B | A | A | A | A |
| Moldability | — | B | B | B | B | B | B | B | B | B |

TABLE 2

| | | | | Example No. | | | | |
|---|---|---|---|---|---|---|---|---|
| | | | | 10 | 11 | 12 | 13 | 14 |
| C | A | | % | 90 | 90 | 90 | 90 | 90 |
| | B | B1-1 | % | 10 | | | | |
| | | B1-2 | % | | 10 | | | |
| | | B1-3 | % | | | 10 | | |
| | | B1-4 | % | | | | 10 | 10 |
| F | | | parts | | | | | |
| D-1 | | | parts | 13.4 | 13.4 | 13.4 | 13.4 | 13.4 |
| D-2 | | | parts | | | | | |
| D-3 | | | parts | | | | | |
| E-1 | | | parts | 20 | 20 | 20 | | |
| E-2 | | | parts | | | | 20 | |
| E-3 | | | parts | | | | | 20 |
| E-4 | | | parts | | | | | |
| G | | | parts | | | | | |
| H | | | parts | 0.5 | 0.5 | 0.5 | 0.5 | 0.5 |
| Surface impact strength | | | cm | 240< | 240< | 240< | 240< | 240< |
| Charpy impact strength | | | kJ/m$^2$ | 6 | 7 | 6 | 6 | 6 |
| Flexural modulus | | | MPa | 8,200 | 8,400 | 8,400 | 8,100 | 8,100 |
| Flame retardancy | | | — | A | A | A | A | A |
| Moldability | | | — | B | B | B | B | D |

| | | | | Example No. | | | | |
|---|---|---|---|---|---|---|---|---|
| | | | | 15 | 16 | 17 | 18 | 19 |
| C | A | | % | 90 | 90 | 90 | 50 | 90 |
| | B | B1-1 | % | | | | | |
| | | B1-2 | % | | | | | |
| | | B1-3 | % | | | | | |
| | | B1-4 | % | 10 | 10 | 10 | 50 | 10 |
| F | | | parts | | 5 | | | |
| D-1 | | | parts | 13.4 | 13.4 | 14.1 | 11.1 | 11.1 |
| D-2 | | | parts | | | | | |
| D-3 | | | parts | | | | | |
| E-1 | | | parts | | 20 | 20 | | |
| E-2 | | | parts | | | | | |
| E-3 | | | parts | | | | | |
| E-4 | | | parts | 20 | | | | |
| G | | | parts | | | | 6 | |
| H | | | parts | 0.5 | 0.5 | 0.5 | | |
| Surface impact strength | | | cm | 240< | 240< | 240< | 240< | 210 |
| Charpy impact strength | | | kJ/m$^2$ | 6 | 9 | 8 | 11 | 10 |
| Flexural modulus | | | MPa | 8,100 | 9,000 | 8,200 | 6,200 | 7,100 |
| Flame retardancy | | | — | B | A | A | B | B |
| Moldability | | | — | B | B | B | B | B |

TABLE 3

| | | | | Comparative Example No. | | | | | | |
|---|---|---|---|---|---|---|---|---|---|---|
| | | | | 1 | 2 | 3 | 4 | 5 | 6 | 7 |
| C | A | | % | 90 | 90 | 50 | 90 | 90 | 90 | 90 |
| | B | B1-1 | % | | | | | | | |
| | | B1-2 | % | | | | | | | |
| | | B1-3 | % | | | | | | | |
| | | B1-4 | % | 10 | 10 | 50 | 10 | 10 | 10 | 10 |
| D-1 | | | parts | | | | 23.0 | | | |
| D-2 | | | parts | 11.3 | 13.4 | 13.4 | | 6.3 | 21.3 | |
| D-3 | | | parts | | | | | | | 13.4 |
| E-1 | | | parts | 1 | 20 | 20 | 20 | 20 | 20 | 20 |
| E-2 | | | parts | | | | | | | |
| E-3 | | | parts | | | | | | | |
| E-4 | | | parts | | | | | | | |
| H | | | parts | 0.5 | 0.5 | 0.5 | 0.5 | 0.5 | 0.5 | 0.5 |
| Surface impact strength | | | cm | 140 | 80 | 90 | 130 | 190 | <15 | 120 |
| Charpy impact strength | | | kJ/m$^2$ | 9 | 5 | 9 | 6 | 5 | 6 | 5 |
| Flexural modulus | | | MPa | 7,600 | 8,200 | 6,600 | 12,600 | 5,300 | 11,300 | 8,500 |
| Flame retardancy | | | — | B | A | A | A | A | A | A |
| Moldability | | | — | B | B | B | C | B | C | B |

TABLE 4

| | | | | Comparative Example No. | | | | |
|---|---|---|---|---|---|---|---|---|
| | | | | 8 | 9 | 10 | 11 | 12 |
| C | A | | % | 45 | 50 | 90 | 90 | 95 |
| | B | B1-1 | % | | | | | |
| | | B1-2 | % | | | | | |
| | | B1-3 | % | | | | | |
| | | B1-4 | % | 55 | 50 | 10 | 10 | 5 |
| D-1 | | | parts | 11.1 | | | | 11.1 |
| D-2 | | | parts | | 11.1 | 11.1 | | |
| D-3 | | | parts | | | | 11.1 | |
| E-1 | | | parts | | | | | |
| E-2 | | | parts | | | | | |
| E-3 | | | parts | | | | | |
| E-4 | | | parts | | | | | |
| H | | | parts | | | | | |
| Surface impact strength | | | cm | 240< | 160 | 170 | 190 | 240< |
| Charpy impact strength | | | kJ/m$^2$ | 11 | 11 | 10 | 10 | 10 |
| Flexural modulus | | | MPa | 6,000 | 6,400 | 7,700 | 7,600 | 7,400 |
| Flame retardancy | | | — | B | A | A | A | A |
| Moldability | | | — | A | A | A | A | B |

From the comparisons between Example 1 and Comparative Example 1, Example 2 and Comparative Example 2, Example 5 and Comparative Example 3, Example 7 and Comparative Example 5, Example 9 and Comparative Example 6, Example 18 and Comparative Example 9, and Example 19 and Comparative Example 10, it became clear that the reinforced thermoplastic resin composition containing the chopped carbon fiber (D) which had been surface treated with a water-soluble polyamide exhibited superior surface impact strength determined by a falling ball test than the reinforced thermoplastic resin composition containing a chopped carbon fiber which had been surface treated with a material other than water-soluble polyamides.

In addition, from the comparisons between Example 2 and Comparative Example 7, and Example 19 and Comparative Example 11, it became evident that the reinforced thermoplastic resin composition containing a chopped carbon fiber which had been surface treated with a water-soluble polyamide exhibited higher surface impact strength determined by a falling ball test than the reinforced thermoplastic resin composition containing a chopped carbon fiber which had been surface treated with a polyamide dissolved in methyl alcohol.

The reinforced thermoplastic resin compositions of Examples 2, 13 and 14 in which the weight average molecular weight of the phosphoric acid ester-based flame retardant (E) was not more than 686 exhibited higher levels of flame retardancy than the reinforced thermoplastic resin composition of Example 15 in which the weight average molecular weight of the phosphoric acid ester-based flame retardant (E) exceeded 686.

In spite of containing the polycarbonate resin (A), the graft copolymer mixture (B) and the inorganic filler (D) which had been surface-treated with a water-soluble polyamide, the reinforced thermoplastic resin composition of Comparative Example 4 in which the content of the inorganic filler (D) which had been surface-treated with a water-soluble polyamide was greater than 22 parts exhibited low moldability.

In spite of containing the polycarbonate resin (A), the graft copolymer mixture (B) and the inorganic filler (D) which had been surface-treated with a water-soluble polyamide, the reinforced thermoplastic resin composition of Comparative Example 12 in which the content of the polycarbonate resin (A) was greater than 90 parts exhibited low moldability.

It should be noted that in Example 1 and Comparative Examples 1 and 3, Examples 2 and 9 and Comparative Examples 4 and 6, Example 3 and Comparative Examples 2, 5 and 7, Example 18 and Comparative Example 9, and Example 19 and Comparative Examples 10, 11 and 12, although the Charpy impact strength values were the same, the surface impact strength values determined by a falling ball test were different from each other. In addition, when comparing Examples 3 and 9 and Comparative Example 3, the surface impact strength determined by a falling ball test reduced as the Charpy impact strength increased. On the other hand, when comparing Example 18 and Comparative Examples 2 and 4, the surface impact strength determined by a falling ball test increased as the Charpy impact strength increased.

Therefore, it became apparent that the correlation between the surface impact strength determined by a falling ball test and the Charpy impact strength was low. In addition, because the Charpy impact strength and the Izod impact strength are highly correlated, it is obvious that the correlation between the Izod impact strength and the surface impact strength determined by a falling ball test is also low.

INDUSTRIAL APPLICABILITY

The reinforced thermoplastic resin composition of the present invention exhibits excellent moldability, generates a minimal amount of gas during molding, and also being capable of providing high rigidity to the resulting molded article while enhancing the drop impact resistance (surface impact strength determined by a falling ball test) when dropping the product.

The molded article of the present invention also has high rigidity and impact resistance when dropping the product, and thus has high industrial applicability.

The invention claimed is:

1. A reinforced thermoplastic resin composition comprising:
   50 to 90% by weight of a polycarbonate resin (A);
   10 to 50% by weight of a graft copolymer mixture (B) (provided that a total amount of the component (A) and the component (B) accounts for 100% by weight); and
   6 to 22 parts by weight of an inorganic filler (D) which has been surface-treated with a water-soluble polyamide, relative to the total of 100 parts by weight of the polycarbonate resin (A) and the graft copolymer mixture (B),
   wherein said graft copolymer mixture (B) contains a graft copolymer (B') in which a graft polymer (B2) having an aromatic alkenyl compound monomer unit (a) and a vinyl cyanide compound monomer unit (b) is graft-polymerized onto a rubber polymer (B1); and a polymer (B") having the aromatic alkenyl compound monomer unit (a) and the vinyl cyanide compound monomer unit (b).

2. The reinforced thermoplastic resin composition according to claim 1 further comprising a phosphoric acid ester-based flame retardant (E).

3. The reinforced thermoplastic resin composition according to claim 2,
   wherein said phosphoric acid ester-based flame retardant (E) has a weight average molecular weight of at least 326 and not more than 800.

4. The reinforced thermoplastic resin composition according to any one of claims 1 to 3,
   wherein said inorganic filler (D) which has been surface-treated with a water-soluble polyamide is a carbon fiber which has been surface-treated with a water-soluble polyamide.

5. A molded article which is formed through molding and processing of the reinforced thermoplastic resin composition according to claim 1.

* * * * *